US011952207B2

(12) United States Patent
Ehrismann et al.

(10) Patent No.: US 11,952,207 B2
(45) Date of Patent: Apr. 9, 2024

(54) PRODUCT TANK AND DEVICE FOR FILLING A CONTAINER WITH A FILLING PRODUCT

(71) Applicant: KRONES AG, Neutraubling (DE)

(72) Inventors: Tobias Ehrismann, Neutraubling (DE); Christina Laumer, Neutraubling (DE); Michael Grauham, Neutraubling (DE); Volker Richter, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/539,547

(22) Filed: Dec. 1, 2021

(65) Prior Publication Data

US 2022/0169441 A1 Jun. 2, 2022

(30) Foreign Application Priority Data

Dec. 2, 2020 (DE) ...................... 10 2020 132 070.1

(51) Int. Cl.
| | |
|---|---|
| *B65D 88/54* | (2006.01) |
| *B67C 3/22* | (2006.01) |
| *B67D 7/74* | (2010.01) |
| *B67D 7/78* | (2010.01) |

(52) U.S. Cl.
CPC ................ *B65D 88/54* (2013.01); *B67C 3/22* (2013.01); *B67D 7/74* (2013.01); *B67D 7/78* (2013.01)

(58) Field of Classification Search
CPC ............. B67D 7/74; B67D 7/78; B65D 88/54
See application file for complete search history.

(56) References Cited

U.S. PATENT DOCUMENTS

| | | | | |
|---|---|---|---|---|
| 2,814,474 A | * | 11/1957 | Erren | B28C 5/2036 366/156.1 |
| 3,093,165 A | | 6/1963 | Risser | |
| 3,417,968 A | * | 12/1968 | Schlecht | B01F 35/754551 366/186 |
| 4,194,925 A | * | 3/1980 | Holbrook | B01F 27/72 134/22.12 |
| 4,201,558 A | * | 5/1980 | Schwitters | A23G 9/20 141/46 |
| 4,588,299 A | * | 5/1986 | Brown | B01F 35/181 366/8 |

(Continued)

FOREIGN PATENT DOCUMENTS

| | | |
|---|---|---|
| CN | 107298421 A | 10/2017 |
| CN | 211198585 U | 8/2020 |

(Continued)

OTHER PUBLICATIONS

Extended European Search Report dated Apr. 8, 2022 in corresponding European application No. EP 21211993.7, 8 pages.

(Continued)

*Primary Examiner* — Timothy L Maust
(74) *Attorney, Agent, or Firm* — Haynes and Boone, LLP

(57) ABSTRACT

A product tank for receiving a liquid product, and a device for filling containers with a filling product, for example in a beverage filling plant, wherein the product tank includes: an outlet for discharge of the product from the product tank along a discharge direction; and a flow guide device which is arranged in the interior of the product tank and is configured to create a cross-flow oriented towards the discharge direction.

12 Claims, 4 Drawing Sheets

(56) References Cited

U.S. PATENT DOCUMENTS

| | | | | |
|---|---|---|---|---|
| 5,470,147 | A | * | 11/1995 | Duckworth ............ B28C 5/143 366/156.1 |
| 5,609,417 | A | | 3/1997 | Otte |
| 6,000,446 | A | * | 12/1999 | Wegman ................ B65B 37/00 141/2 |
| 7,828,022 | B2 | * | 11/2010 | Davidson ............... B29C 64/35 264/497 |
| 2006/0174966 | A1 | * | 8/2006 | Facchini ................ B65B 37/02 141/67 |
| 2008/0017262 | A1 | | 1/2008 | Higashino et al. |
| 2012/0297986 | A1 | | 11/2012 | Suda et al. |
| 2013/0092284 | A1 | * | 4/2013 | Holland ................. F16N 35/00 222/251 |
| 2014/0262172 | A1 | * | 9/2014 | Ljubicic ............... F28D 7/1684 165/154 |

FOREIGN PATENT DOCUMENTS

| | | |
|---|---|---|
| DE | 10 2016 214 857 A1 | 2/2018 |
| DE | 102017120323 A1 | 3/2019 |
| DE | 102018130652 A1 | 6/2020 |
| JP | 2009119425 A | 6/2009 |
| KR | 10 0 952 154 B1 | 4/2010 |
| WO | WO 2009/145 874 A1 | 12/2009 |
| WO | WO 2019/043240 | 3/2019 |

OTHER PUBLICATIONS

Search Report dated Jun. 26, 2023 from corresponding German application No. 10 2020 132 070.1, 6 pages.
Chinese Office Action dtd Dec. 27, 2023 for CN Application No. 202111457607.9, 7 pages.

* cited by examiner

PRODUCT TANK AND DEVICE FOR FILLING A CONTAINER WITH A FILLING PRODUCT

CROSS-REFERENCE TO RELATED APPLICATIONS

This application claims priority from German Patent Application No. DE 10 2020 132 070.1, filed on Dec. 2, 2020 in the German Patent and Trademark Office, the disclosure of which is incorporated herein by reference in its entirety.

BACKGROUND

Technical Field

The present invention concerns a product tank for receiving a liquid product, and a device for filling containers with a filling product, both in certain embodiments in a beverage filling plant.

Related Art

In beverage filling plants, product tanks are used for receiving and temporarily storing the product to be filled or components thereof at several locations. Thus it is known for example to mix the product to be filled in a mixer, wherein here usually a base substance and/or syrup is mixed into a previously prepared and preferably degassed product water stream. The resulting filling product is held in a product tank known as a "buffer tank" and initially temporarily stored before being filled in a filler. The filler may also have a product tank, for example in the form a central boiler or a ring line, for supplying several filler valves, via which the filling product is finally conducted into the containers to be filled.

Alternatively, the filling product may be supplied from the buffer tank to the filler valves without a further intermediate product tank. A device of this nature is disclosed in WO 2019/043240 A1.

The above-mentioned product tanks have at least one outlet for discharge of the filling product to the next processing station. The outlet may be directed downward or run laterally, in particular laterally tangentially. In both cases, depending on process and environmental conditions (through-flow, geometry, fill level, viscosity etc.), an eddy may form at the outlet due to the occurrence of centrifugal forces. An "eddy" is a rotating whirlpool with straight or oscillating rotational axis, which can occur at the outlet, for example because of the rotation of the earth, the movement of the medium, forces of wall friction or other reasons. Under the received impulses, the angular speed rises when the particles approach the rotational axis. The eddy is accelerated.

Such an eddy formation is disadvantageous when filling liquid filling products, in particular when filling beverages, since the eddy can carry gas bubbles from the head space of the product tank into the filling product. These may in turn reduce the quality of the filling product and can also lead to the through-flows measured in the filler valves by flow meters being incorrect. Also, the filling product can foam up in the containers.

Eddies can form at both downwardly directed outlets and lateral outlets. One method of reducing eddy formation is to significantly increase the fill level in the tank; however, in the case of beverage filling plants, this is often undesirable for process reasons and cannot be implemented when filling residual quantities, i.e. when emptying the product tank.

SUMMARY

An improved product tank for receiving a liquid product, and an improved device for filling containers with a filling product, in particular to reduce any gas transfer into the product or filling product are described herein according to various embodiments.

The product tank serves for receiving and for any intermediate storage of a liquid product, in particular of a filling product to be filled, for example in a beverage filling plant. The product or filling product is in particular a beverage such as for example water (still or carbonated), soft drinks, smoothies, milk products, beer, wine, mixer drinks and similar. Here, the product tank is usually not completely filled but has a head space above the fill level which contains a gas, for example air or $CO_2$.

The product tank according to certain embodiments comprises an outlet for discharge of the product from the product tank along a discharge direction, and a flow guide device which is arranged in the interior of the product tank and is configured to create a cross-flow oriented transversely to the discharge direction.

Because the flow guide device creates a cross-flow directed towards the outlet direction, any eddy forming at the outlet is "flushed away" from the outlet and detached. An eddy in some embodiments forms on the shortest route between the outlet and the liquid level or surface. As the distance between the outlet and the incipient eddy increases under the effect of a cross-flow, the eddy breaks up again before gas can be drawn in from the head space of the product tank. In this way, any gas transfer to the product can be reduced.

The outlet may be directed downward or run laterally, in particular laterally tangentially. Usually, the outlet is arranged in the lower region of the product tank.

It is pointed out that the spatial designations used herein, such as "horizontal", "vertical", "lateral", "top", "bottom", "above", "below" and similar, are defined clearly and unambiguously by the intended installation position of the product tank.

In certain embodiments, the flow guide device comprises at least one guide plate in the region of the outlet which covers part of the product tank cross-section. The guide plate forms a mechanically simple and reliable means of creating the cross-flow, since an incipient eddy leads to a rotation of the liquid which is deflected by the guide plate.

If the guide plate is optimally positioned and oriented according to the process conditions (composition of product, geometry of product tank, position and shape of outlet etc.), an eddy formation and hence the outflow of gas can be almost completely prevented irrespective of the performance level.

To this end, the at least one guide plate is in some embodiments connected fixedly and/or flush on an inner wall of the product tank. In several embodiments, the at least one guide plate and the inner wall of the product tank are welded together. In this way, the connection between the product tank and the guide plate is particularly hygienic. The same applies to further or all guide plates where present.

According to an alternative exemplary embodiment, a fixing frame is provided inside the product tank on which the guide plate is or can be attached. The fixing frame may be mounted releasably and adjustably in the product tank, so that the position and attitude of the guide plate can be adjusted and adapted to modified process conditions. Alternatively or additionally, the guide plate is in some embodiments mounted releasably on the fixing frame, for example screwed on. In this way, one or several guide plates may be retrofitted quickly and easily if required. Furthermore, the optimal position and orientation of the guide plate or plates can thus be determined without damaging the product tank.

In one or more embodiments, the fixing frame has one or more arms which rest on an inner wall of the product tank. The fixing frame may for example have four arms arranged in a cross, whereby it can be supported on different sides or at different positions on the inner wall of the product tank. In certain embodiments, the fixing frame rests against the inner wall of the product tank purely by pressure, i.e. it is effectively clamped in the product tank. In this way, the guide plate can be rapidly and easily positioned and attached in the product tank without bores, fixing hooks, flanges, lugs or other fixing means which could adversely affect the structure of the product tank.

In some embodiments, the product tank has a cylindrical interior which defines an axial direction. The guide plate is in various embodiments arranged in the lower region of the product tank and is spaced from the outlet in the axial direction of the product tank. In this way, in the case of eddy formation, the guide plate acts on the outwardly driving, rotating fluid stream and deflects this. In one or more embodiments, to this end, the guide plate covers approximately one-quarter of the product tank cross-section. For this, the guide plate may have the form of a circle segment, in particular a quarter circle segment, and be mounted on two arms in the case of the above-mentioned four-armed fixing frame.

In some embodiments, the at least one guide plate is arcuate and is mounted such that at least in portions it runs on the inner wall of the product tank and protrudes into the interior of the product tank perpendicularly to the axial direction. The arcuate guide plate is in certain embodiments arranged at the position of the outlet in the axial direction. It may be observed that an eddy does not remain constantly at one location but moves to different positions, but always aims upward from the outlet in the direction of the head space of the product tank. A guide plate at the axial height of the outlet deflects the rotating liquid and a cross-flow occurs, the eddy is "stopped" and is thereby destroyed.

In several embodiments, two arcuate guide plates are provided which are formed and mounted such that they run on the inner wall of the product tank at the same position in the axial direction, and protrude into the interior of the product tank perpendicularly to the axial direction, wherein they are arranged at the position of the outlet in the axial direction so as to delimit the outlet. In other words, to adapt the installation of the guide plates to the geometry of the outlet, according to this embodiment variant the guide plates are arranged on the left and right of the outlet, standing perpendicularly to the inner wall and running upward from the outlet along the inner wall in an arcuate form. In this way, a reliable eddy protection can be achieved in a mechanically simple fashion.

In certain embodiments, an outlet cover is provided which is arranged in the product tank at a distance from the outlet in the discharge direction, and covers this. The plate plane of the outlet cover stands perpendicularly to the discharge direction. In the case of an outlet oriented vertically downward, the outlet cover is thus positioned above the outlet. The outlet cover functions as a further device for reducing the eddy formation. In various embodiments, the diameter of the outlet cover is greater than that of the outlet, whereby the outlet cover overlaps the outlet in the radial direction.

In one or more embodiments, the flow guide device comprises several, preferably precisely four paddles which are installed or mounted on the outlet plate, wherein the paddles protrude radially beyond the outlet plate. Because the paddles protrude radially beyond the outlet plate, the rotating liquid of an incipient eddy is deflected thereby and a cross-flow to the eddy occurs, destroying the eddy. The paddles may be mounted directly on the outlet plate via a paddle fixing so they can be installed easily and reliably.

In some embodiments, the flow guide device has a branch pipe which has an opening in the region of the outlet and is configured to divert a part flow of the product to be discharged via the outlet, wherein the diverted part flow in various embodiments stands substantially perpendicularly to the discharge direction. Because the part flow diverted by the branch pipe flows perpendicularly to the outlet stream, or at least has a vector component perpendicular thereto, a cross-flow occurs which "carries" the eddy with it even as it is created, and prevents the eddy from being able to develop and stabilise.

In certain embodiments, the branch pipe runs in the axial direction of the product tank starting from the opening in the region of the outlet. The branch pipe may then lead out of the product tank in the part flow direction, for example via a 90° deflection, wherein in this case, outside the product tank, the branch pipe is configured to return the diverted part flow to the product tank at another point. The part flow can be diverted by means of a vacuum or a pump. In this way, the cross-flow is actively generated, wherein the cross-flow can be regulated by the amount of the part flow, volume flow or similar even during regular operation, for example depending on the fill level in the product tank, in order always to guarantee an optimum eddy prevention.

A device for filling containers with a filling product, wherein the device comprises a product tank according to one of the embodiment variants presented above, is also described herein according to various embodiments.

The features, technical effects, advantages and exemplary embodiments described in relation to the product tank apply similarly to the device.

The product tank may for example be produced as a boiler or ring line of a filler for supplying filler valves.

In some embodiments, the device comprises a mixer for mixing the filling product from at least two components, and one or more filler valves for filling the container with the filling product, wherein the product tank is configured for buffered storage of the filling product mixed in the mixer. In this case, the product tank is also known as the "buffer tank". Because of the integrated flow guide device, it is able to conduct the filling product to the filler or filler valves without loss of quality.

In one or more embodiments, the filler valve or valves is/are connected without buffering to the buffer tank.

Because the filler valve is connected without buffering to the buffer tank, no intermediate buffer or in particular no filler boiler is required between the filler valve and the buffer tank, giving a more efficient structure. In other words, at least one buffer tank provided in conventional product filling plants may be omitted in the device. This leads to an improvement of the structure, partly because the total fill product volume in temporary buffers can be reduced, leading to an improved efficiency of the device since less or no filling product need be rejected at the end of filling or on a product change.

Furthermore, the device can be controlled or regulated more easily since there is no need for coordination between the mixer and filler valve, or for monitoring fill levels of several buffers which interact with one another.

Since the filling product is in several embodiments transported from the buffer tank to the filler valve without buffering, a buffer tank is particularly useful in the embodiment of a product tank with flow guide device, since otherwise any gas introduced into the filling product could directly reach the filler valve.

The term "without buffering" here means that there is no dedicated buffer device which allows buffered storage of filling product, for example during production breaks or on faults of the filler device. A buffer device in particular does not mean the existing pipelines, through which the filling product flows and which are filled with the filling product during filling operation either over their entire cross-section or at least over part of the cross-section. Also, a ring line in a filler carousel, which supplies filling product to the respective filler valves, is not a buffer according to the present interpretation.

A buffer device rather means only a dedicated buffer reservoir provided as such, which provides a corresponding buffer volume. Thus the buffer device may contain a substantial quantity of additional filling product which is produced during production breaks or on plant faults, and cannot be received directly by the filler device.

Alternatively or additionally, the mixer may be connected to the buffer tank without buffering. Between the mixer and the filler valve, there is in some embodiments only a single buffer tank which provides both intermediate storage of the filling product produced in the mixer and also a stock of filling product produced in the mixer for supply to the filler valve. Thus the total buffer volume to be kept can be reduced, and dependencies between different buffer tanks, e.g. with respect to fill levels, can be avoided. Accordingly, not only can the efficiency of the device be increased, but defined conditions for the filler valve may also be provided.

Further advantages and features of the present invention are evident from the following description of exemplary embodiments. The features described therein may be implemented alone or in combination with one or more of the features presented above, insofar as these features are not mutually contradictory. The following description of exemplary embodiments is given with reference to the accompanying figures.

BRIEF DESCRIPTION OF THE FIGURES

Further embodiments of the invention are explained in more detail in the following description of the figures.

DETAILED DESCRIPTION

Figure 1:
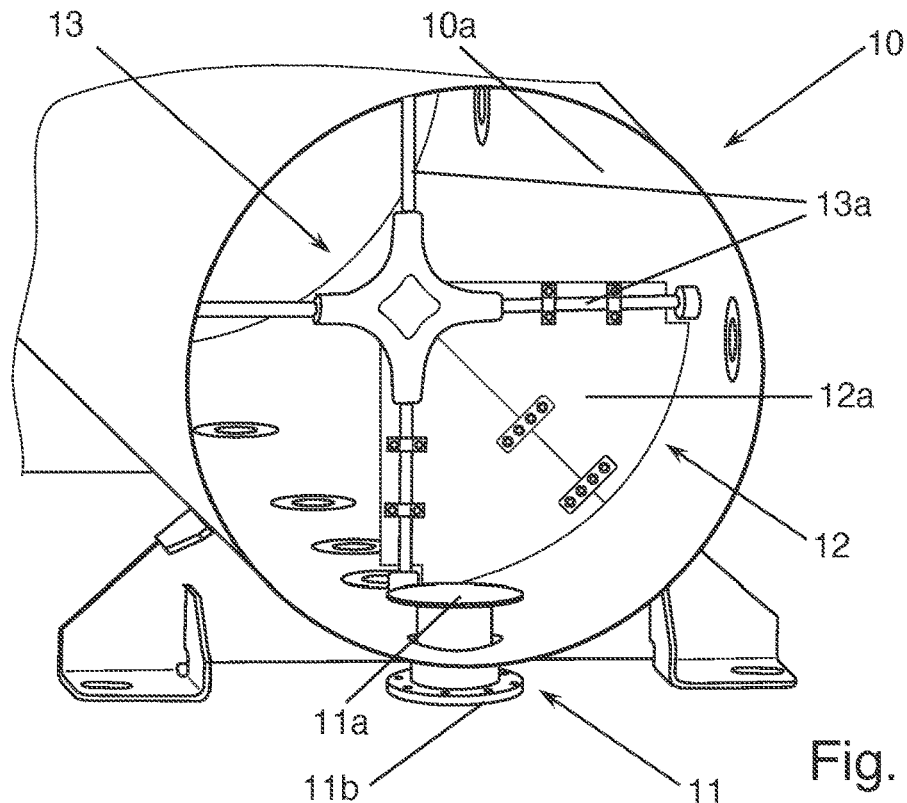
FIG. 1 is a product tank with a flow guide device for reducing eddy formation, according to an exemplary embodiment.

Exemplary embodiments are described below with reference to the figures. The same or similar elements or those of equivalent function in the different figures carry the same reference signs, and a repeated description of these elements has been omitted in some cases in order to avoid redundancy.

FIGS. 1, 2, 3, 4a and 4b show various exemplary embodiments of a product tank 10. The product tank 10 here has for example a cylindrical form, but may be designed otherwise insofar as it is suitable for receiving and temporarily storing a liquid product, in particular a filling product to be filled. In particular, the product is a beverage such as for example water (still or carbonated), soft drinks, smoothies, milk products, beer, wine, mixer drinks and similar. Here the product tank 10 is usually not completely filled, but above the fill level is a head space which contains gas, for example air or $CO_2$.

The product tank 10 has an outlet 11 which is here oriented for example downward, e.g., in the direction of gravity. The outlet 11 may however also be arranged on the side, e.g., in the lower region of the product tank 10, running substantially horizontally and in some cases tangentially to the product tank 10. The outlet 11 defines a discharge direction which, in the case of an outlet 11 directed downward, corresponds to the direction of gravity.

The outlet 11 is equipped with an outlet cover 11a which is arranged above the outlet 11 or its opening and perpendicularly to the discharge direction, which in the present case corresponds to the direction of gravity. The outlet cover 11a acts as a first device for reducing eddy formation, but it may not be able to prevent this completely.

The outlet 11 furthermore has an outlet connection 11b to which a line can be connected for discharging the product.

The product tank 10 furthermore comprises a flow guide device 12 which is configured to generate one or more cross-flows in order to flush an incipient eddy away from the outlet 11 and thereby break this up as it occurs.

In the exemplary embodiment of FIG. 1, the flow guide device 12 comprises a guide plate 12a, which is arranged at the side of the outlet 11 and is configured to generate the above-mentioned cross-flow. To this end, the guide plate 12a may cover part of the tank cross-section in the horizontal direction, for example around one-quarter of the tank cross-section. The guide plate 12a here has the form of a circle segment which, on the outside, ends at the circle arc on the inner wall 10a of the product tank 10 and extends inward from there.

An eddy forms in some embodiments on the shortest route between the outlet 11 and the liquid level or surface. As the distance between the outlet 11 and the incipient eddy becomes greater, the eddy breaks up again before gas can be drawn out of the head space of the product tank 10.

If the guide plate 12a is positioned at the correct location on the product tank 10, the occurrence of an eddy and hence the outflow of gas can be almost completely prevented, irrespective of the performance level.

In various embodiments, the guide plate 12a is fixedly welded to the tank wall 10a. In order however to be able to position and attach the guide plate 12a quickly and easily, a fixing frame 13 may be provided on which the guide plate 12a may be attached, for example screwed via clamps. The fixing frame 13 is supported via several, for example four arms 13a on the inner wall 10a of the product tank 10. In this way, the guide plate 12a can be positioned and installed quickly and easily without bores, fixing hooks, flanges, lugs or other fixing means which could adversely affect the structure of the product tank 10.

The guide plate 12a described here is an efficient means of preventing eddies also in the case of a lateral or lateral-tangential outlet 11.

Figure 2:
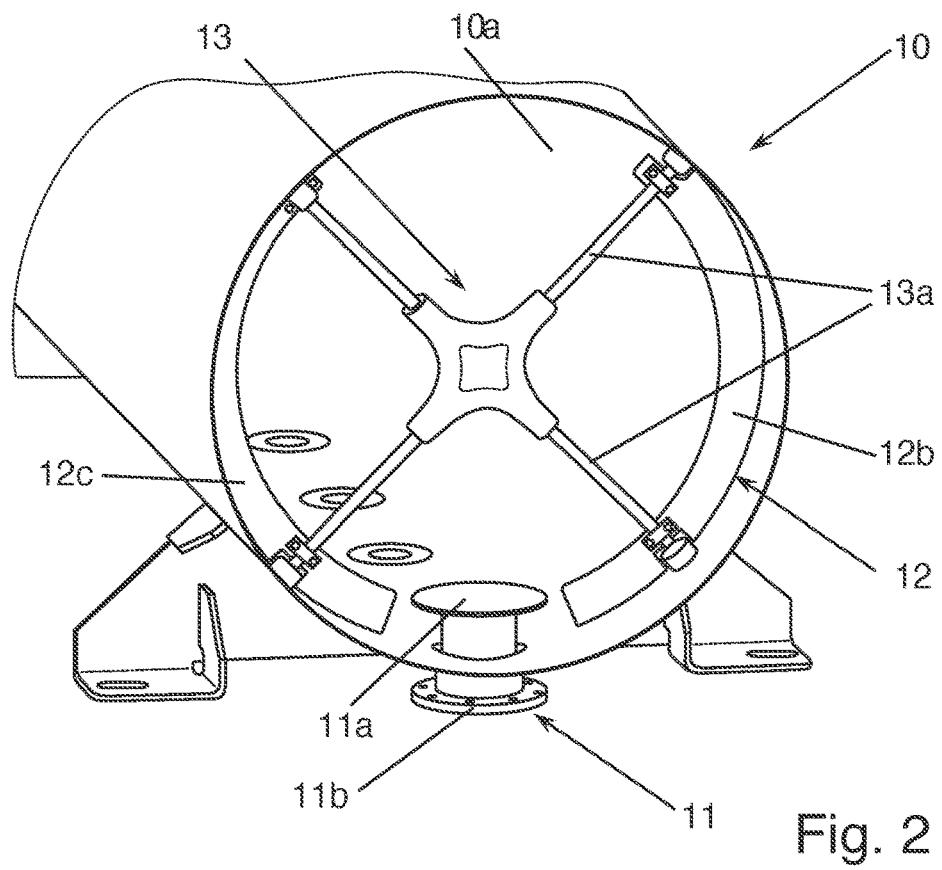
FIG. 2 is a product tank with a flow guide device for reducing eddy formation, according to a further exemplary embodiment.

A derivative exemplary embodiment, which is also based on use of guide plates, is shown in FIG. 2.

Here, two arcuate guide plates 12b, 12c are formed and mounted on the fixing frame 13 so they run on the inner wall 10a of the product tank 10 and extend inward by a specific distance. In order to adapt the installation of the guide plates 12b, 12c to the geometry of the vertical central outlet 11, the guide plates 12b, 12c are arranged on the left and right of the outlet 11, standing perpendicular to the inner wall 10a and running from the outlet 11 upward along the inner wall 10a. In other words, the guide plates 12b, 12c are situated at the position of the outlet 11 viewed in the axial direction of the cylindrical product tank 10. The outlet 11 and in some cases an upper portion of the product tank 10 are delimited by the guide plates 12b, 12c.

It may be observed that an eddy does not remain constantly at one location but moves to various positions, always however emerging from the outlet 11 or the gap between the outlet plate 11a and the outlet opening and aiming upward in the direction of the head space of the product tank 10. The rotating liquid is deflected at the guide plates 12b, 12c and a cross-flow occurs, the eddy "stops" and is thereby destroyed.

Figure 3:
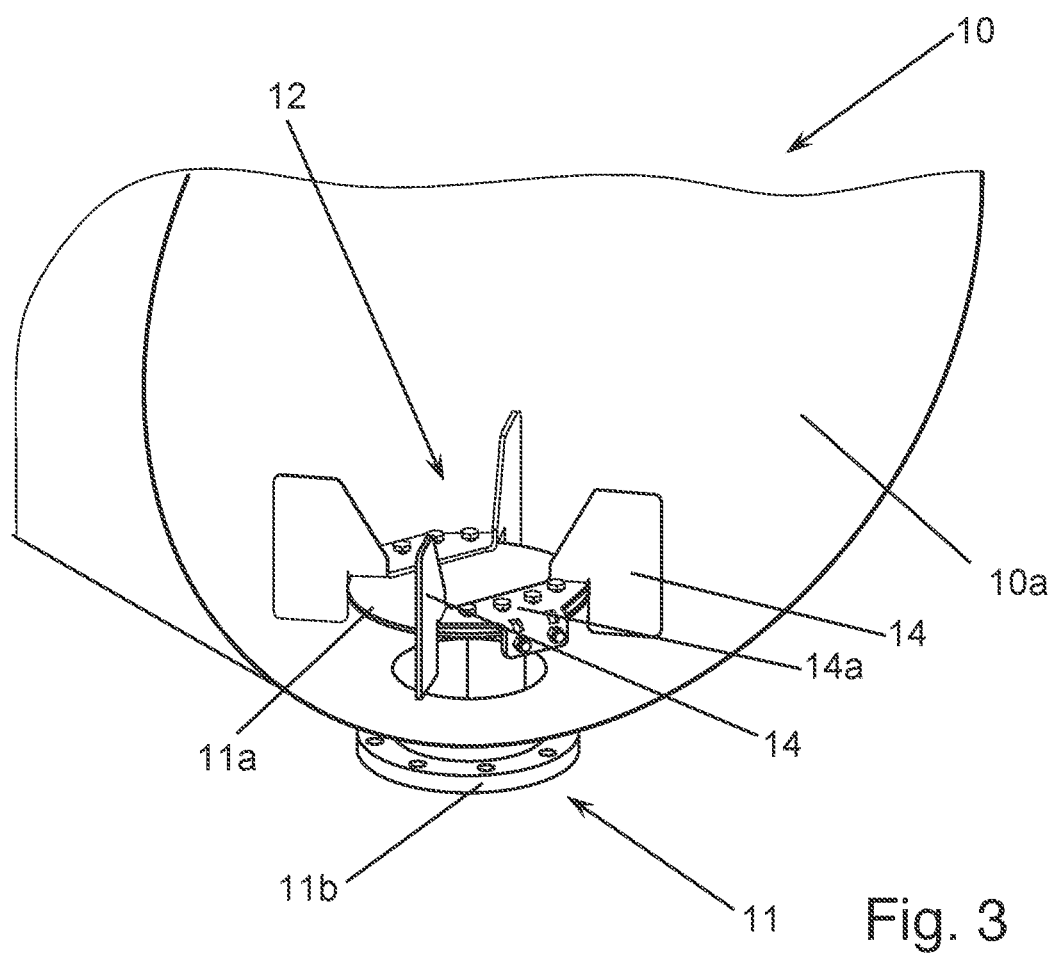
FIG. 3 is a product tank with a flow guide device for reducing eddy formation, according to a further exemplary embodiment.

The exemplary embodiment of FIG. 3 is based on a similar principle, wherein instead of the guide plates 12b, 12c at the level of the outlet 11, several, for example four, paddles 14 are mounted on the outlet plate 11a. The paddles 14 protrude radially beyond the outlet plate 11a so that the rotating liquid of any incipient eddy is deflected thereon, a cross-flow to the eddy occurs, whereby the eddy is destroyed. The paddles 14 are attached directly to the outlet plate 11a via a paddle fixing 14a, whereby they can be installed easily and reliably. The paddle fixing 14a and the paddle or paddles 14 may be formed as one piece or partially integrally, as an example of FIG. 3.

Figure 4A:
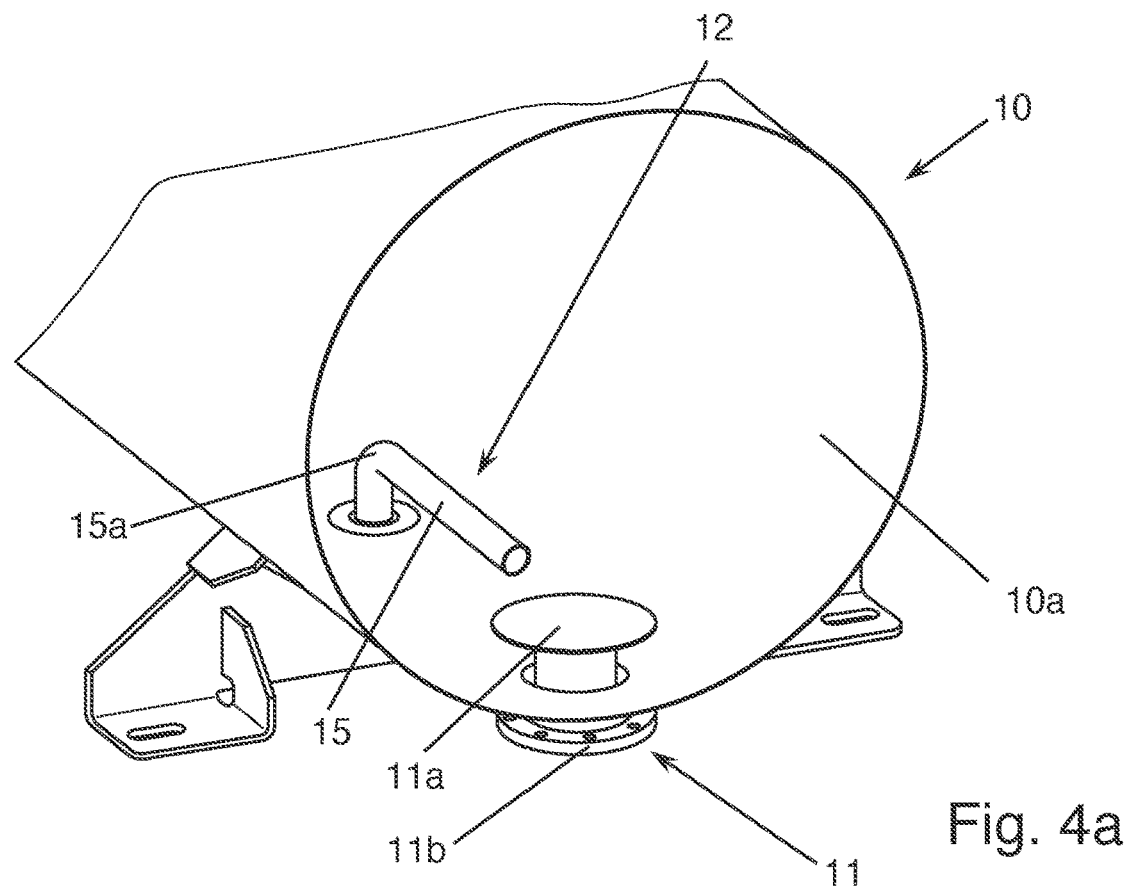
FIG. 4a is a product tank with a flow guide device for reducing eddy formation, according to a further exemplary embodiment.
Figure 4B:
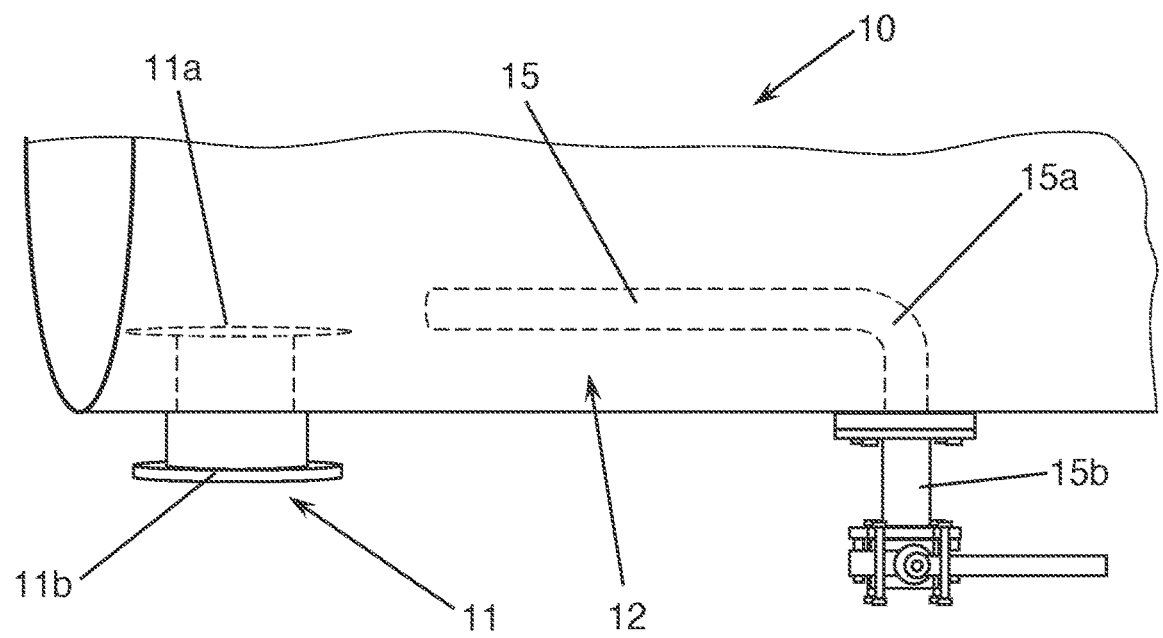
FIG. 4b is the product tank with flow guide device for reducing eddy formation according to FIG. 4a from another perspective.

FIGS. 4a and 4b show a further exemplary embodiment in which the cross-flow relative to an incipient eddy is actively generated by diverting a part flow via a branch pipe 15. The branch pipe 15 has an opening in the region of the outlet 11 or at the side thereof, and runs substantially vertically or at least with a vector component which is vertical to the discharge direction, i.e. to the rotational axis of any eddy. In the present example, the branch pipe 15 runs in the axial direction for some way parallel to the inner wall 10a of the product tank 10, then it is deflected at a deflector 15a towards the inner wall 10a, then leaves the product tank 10 in order then to be conducted outside the product tank 10 via an external pipe portion 15b (see FIG. 4b), and returned to the product tank 10 at another point.

Since the part flow diverted via the branch pipe 15 flows perpendicularly to the outlet flow, a cross-flow occurs which, even on its creation, "carries" the eddy with it and prevents the eddy from being able to form and stabilise. To create the part flow, a vacuum may be generated in the branch pipe 15, for example by means of a pump (not shown in the figures).

A product tank 10 of the exemplary embodiments described above is used for example in a device for filling containers, in particular in a beverage filling plant.

Figure 5:
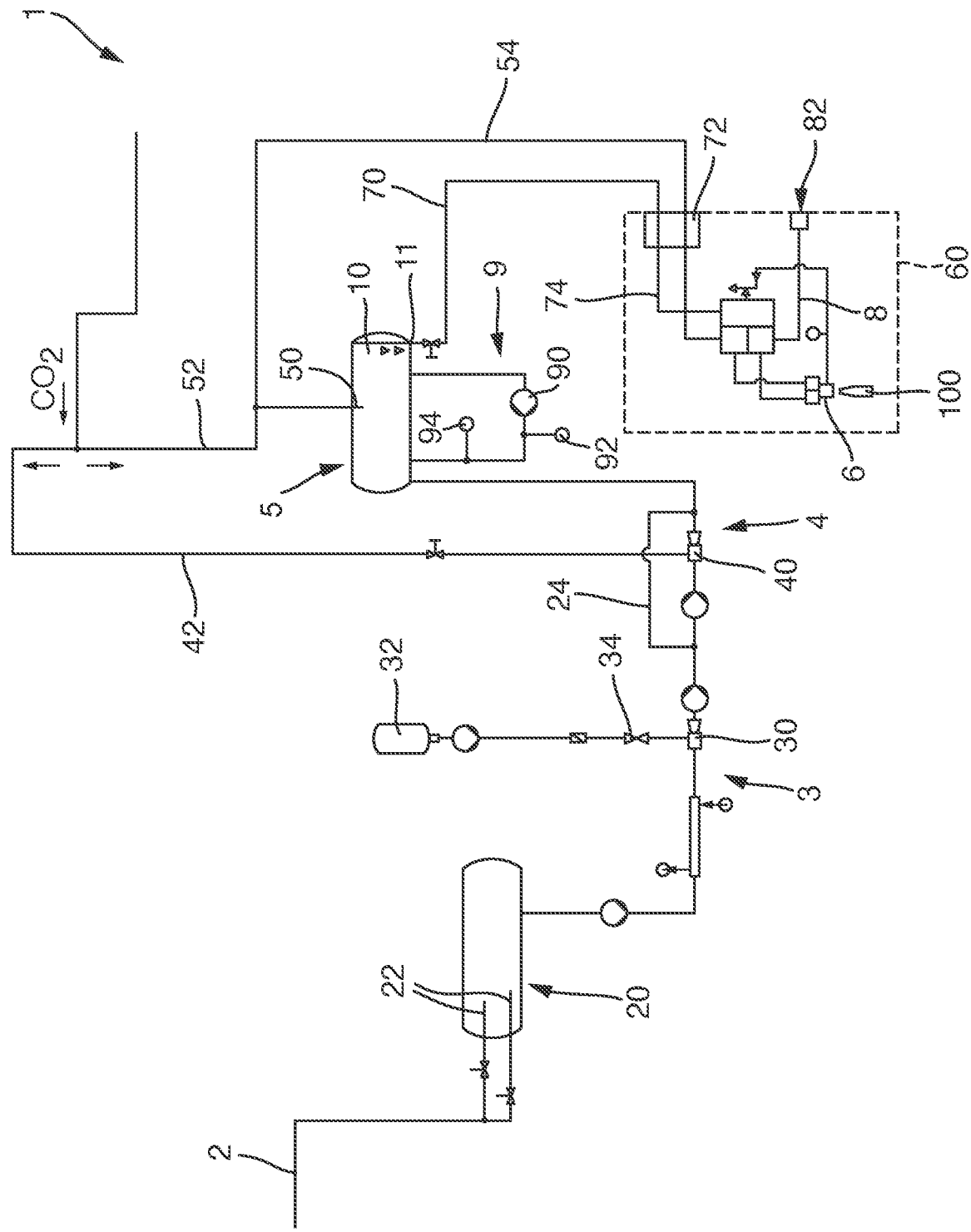
FIG. 5 is a schematic illustration of a device for filling containers according to a further exemplary embodiment.

FIG. 5 shows a device 1 according to an exemplary embodiment for filling a schematically indicated container 100 with a filling product, wherein the device 1 is here shown in the form of a beverage filling plant. The device 1 serves for example for filling a stream of supplied containers to be filled with a carbonated soft drink.

FIG. 5 is now described with reference to the flow of the filling product into the containers 100 to be filled.

Firstly, the product water, which may already be cleaned and treated, is supplied from a product water supply 2 to a degassing device 20. The degassing device 20 is here indicated schematically in the form of a degassing tank, in which the product water obtained from the product water supply 2 is sprayed via schematically indicated spray nozzles 22.

The degassing device 20 may be provided in the form of pressure degassing, in which the oxygen and nitrogen parts in the product water are expelled by the addition of $CO_2$.

The degassing device 20 may however also be provided in the form of vacuum degassing, in which a vacuum is provided in the degassing tank, whereby the oxygen and nitrogen parts in the product water are extracted.

Spraying the product water via the spray nozzles 22 in the degassing tank of the degassing device 20 serves to increase the surface area of the water, so that the degassing process can be carried out efficiently.

After the degassing device 20, the product water thus prepared is supplied to a mixer 3 which can mix the filling product from at least two components.

The first component is here the product water stream already described. The second component may for example be the base substance of the soft drink and/or a syrup.

The mixer 3 accordingly has a dosing valve 34 which feeds a component from the syrup reservoir 32 into the product water supply via a dosing point 30. Accordingly, the supplied syrup is mixed with the supplied pretreated product water in the dosing point 30, and in this way the filling product is mixed.

The syrup reservoir 32 serves in particular also as a bubble separator, so that the syrup extracted from the syrup reservoir 32 is substantially bubble-free and accordingly a reliable dosing is achieved.

In the exemplary embodiment shown, only a single dosing point 30 is provided, so that the prepared product water is mixed at this dosing point 30 with a component, here stored in the syrup reservoir 32. Depending on the design of the mixer 3 however, also two, three or any number of such dosing points 30 could be installed, in order to finally mix the desired filling product by mixing the respective components accordingly by the addition of different components to the respective product water stream (already mixed with other components).

Then in the exemplary embodiment shown, a carbonating device 4 is provided at the mixer 3 which carbonates the mixed filling product. For this, a carbonating point 40 is provided, which for example may be formed as a carbonating nozzle via which $CO_2$, supplied from the $CO_2$ supply 42, is introduced into the fully mixed filling product. The dosing of the $CO_2$ which is supplied to the filling product via the carbonating point 40 depends on the desired properties of the filling product.

A bypass 24 is provided around the carbonating point 40 which is configured to always provide the same conditions with respect to the through-flow and/or pressure for the $CO_2$ dosing, irrespective of the mixer power or the mixer output.

The filling product, which is finally produced in this way and also present in the carbonation provided after the carbonation device 4, is temporarily stored in a product tank 10 which is known as the "buffer tank" in the application of the mixer 3 shown here.

The buffer tank 10 accordingly receives the fully mixed and carbonated filling product and forms a filling product reservoir for the filler described below. In the buffer tank 10, the carbonation of the mixed and carbonated filling product can be maintained in that the buffer tank 10 is preloaded with $CO_2$ at a pressure which avoids separation of the $CO_2$ bonded into the filling product.

The buffer tank 10 is prepressurised by a prepressurisation device 50, via which the $CO_2$ is introduced into the head space of the buffer tank 10 from the $CO_2$ supply 52. Thus accordingly, in the buffer tank, a $CO_2$ atmosphere prevails at a pressure which prevents the separation of the $CO_2$ from the mixed and carbonated filling product temporarily stored in the buffer tank 10.

The buffer tank 10 is connected to a filler valve 6 of a filler (indicated schematically) for filling the container 100 to be filled. The filler may comprise a boiler, a ring line or similar, for example in the form of a product tank according to the exemplary embodiments described above, for supplying the filler valve 6; or as shown in FIG. 5, the connection may be present without buffering. Thus a fluid connection is formed between the buffer tank 10 and the filler valve 6 so that no intermediate buffering of filling product is provided here.

In the exemplary embodiment shown, the gas space of the buffer tank 10 is also connected to the filler valve 6 via a pressurising gas line 54 in order to provide pressurising gas for the filler valve 6. The buffer tank 10 is connected to the head space of the container 100 to be filled by this pressurising gas line 54 during the filling process. By this connection, the container 100 is pre-pressurised and on filling, the return gas is returned to the buffer tank 6.

In this context, conventional line connections are not buffers. A buffer is rather only a dedicated reservoir formed as a buffer with a corresponding volume which not only serves to transport the filling product but also allows temporary storage. Also, in this context, process-engineering components such as for example shut-off valves, sensors, flow meters, valves, pipe clamps, branches etc. are not buffers since they serve to conduct the filling product but do not provide a buffer volume, and hence have no buffering effect.

The filler valve 6 is provided on a schematically indicated filler carousel 60 of the filler. Usually, several filler valves 6 are installed on its periphery. A filler carousel 60 is usually provided in beverage filling plants in order to receive a constant stream of containers to be filled, to fill these with filling product via the respective filler valves 6 during their circulation, and then to discharge the filled containers 100 again to a downstream transport or processing device.

In order to transfer the filled product from a stationary plant part of the device 1, in which amongst others the buffer tank 10 and filling product line 70 are provided, to the filler carousel 60 rotating relative thereto, a rotary distributor 72 is provided. The rotary distributor 72 accordingly transfers the filling product supplied via the filling product line 70 to a further filling product line 74 on the filler carousel 60, via which the filling product is then conducted to the filler valve 6 or filler valves 6.

In the concrete embodiment in FIG. 5, a filling product line 70 is provided between the buffer tank 10 and the rotary distributor 72. By means of the rotary distributor 72, the filling product is transferred from the part of the filling product line 70 situated in the stationary part of the device 1, to the filler carousel 60 rotating relative thereto. On the filler carousel 60, the filling product is then transported from the part of the filling product line 70 present on the filler carousel 60, to the filler valve 6.

The filler valve 6 is in some embodiments a proportional valve. By designing the filler valve 6 as a proportional valve, it is possible to regulate the filling product stream, supplied via the filler valve 6 to the container 100 to be filled, in several stages or in various embodiments steplessly.

The filler valve 6 may for example be configured in the form of a cone valve, wherein a valve seat is provided into which a valve cone can be lowered in order to close the valve. A stepped or stepless lifting of the valve cone from the valve seat allows a variation of the cross-section of the ring gap resulting between the valve cone and the valve seat, so that this in turn leads to a variation of the filling product stream flowing through the proportional valve.

The embodiment shown in FIG. 5 accordingly allows the mixed and carbonated filling product contained in the buffer tank 10 to be transferred to the filler valve 6 and then filled under control into the containers 100 to be filled. Since the filling product is transported from the buffer tank 10 to the filler valve 6 in various embodiments without buffering, a buffer tank 10 is particularly useful in the design of a product tank with a flow guide device 12, since any gas introduced into the filling product would directly reach the filler valve 6.

In a particularly advantageous embodiment (also shown in FIG. 5), the buffer tank 10 is arranged above the filler valve 6, and the filling product line present between the filler valve 6 and buffer tank 10 is arranged such that it is constantly rising. Accordingly, there is no siphon effect. Thus no gas present in the filler valve 6 can rise continuously to the buffer tank 10 and vent into this without collecting at a specific position in the filling product line.

In other words, the gas present in the filler valve 6 and/or the filling product line 70 can rise in the rising filling product line 70, so that the filling product is present accordingly at the filler valve 70 without the presence of gas bubbles.

It is evident from FIG. 5 that, in several embodiments, no buffer is arranged between the mixer 3 and the buffer tank 10. Accordingly, the mixer 3 is connected to the buffer tank 10 without buffering.

Consequently, this gives a very efficient structure of the device 1 since only a single buffer tank, namely the buffer tank 10, is arranged between the mixer 3 and the filler valve 6.

Because in some embodiments only a single buffer tank 10 is provided, the respective fill level of the filling product in the buffer tank 10 can easily be controlled or regulated, and the complex dependencies known from the prior art between different buffer tanks do not occur with the exemplary embodiment shown, so that process control or process management is simplified.

In order to allow venting of the container, filled with the carbonated filling product, at the filler valve 6 before removal of the container 100 from the filler valve 6, for example a pressure relief line 8 is provided which is conducted to the outside via a rotary distributor 82.

Accordingly, a CIP cleaning of the regions of the device 1 carrying filling product can also be carried out via this pressure relief line 8 and the rotary distributor 82.

Because in some embodiments only a single buffer tank 10 is provided, the cleaning process can thus also be simplified and the surfaces areas concerned, which may lead to a cooling of the cleaning medium and increase cleaning effort, can be reduced.

In order to be able to monitor and regulate the quality of the filling product in the buffer tank 10, a circulation line 9 is also provided in which, by means of the circulation pump 90, filling product can be extracted from the buffer tank 10 and returned to this. In the circulation line 8, for example a $CO_2$ sensor 92 is provided for monitoring the $CO_2$ content of the filling product, and a Brix sensor 94 for reading the Brix values. Other sensors may be provided additionally or alternatively in the circulation line 9.

Accordingly, this gives a particularly efficient structure of the device which is associated with reduced material usage in construction of the device and hence a reduced investment volume, and also results in more efficient filling since the total filling product volume to be stored can be reduced, and accordingly the filling product volumes rejected at the end of production or on a product change can be reduced or avoided.

Where applicable, all individual features which are depicted in the exemplary embodiments may be combined with one another and/or interchanged without leaving the scope of the invention.

What is claimed is:

1. A product tank for receiving a liquid product, comprising:
    an outlet configured to discharge the liquid product from the product tank along a discharge direction; and
    a flow guide device that is arranged in an interior of the product tank and is configured to create a cross-flow oriented towards the discharge direction, wherein the flow guide device comprises at least one guide plate that covers part of a cross-section of the product tank and is fixed to an inner wall of the product tank, and the product tank comprises a cylindrical interior defining an axial direction, and
    wherein the at least one guide plate is arranged in a lower region of the product tank and is spaced from the outlet in the axial direction of the product tank, and the at least one guide plate covers about one-quarter of the cross-section of the product tank, or
    wherein the at least one guide plate is arcuate and is mounted such that at least in portions, the at least one guide plate runs on the inner wall of the product tank and protrudes into the interior of the product tank perpendicularly to the axial direction.

2. The product tank of claim 1, wherein the at least one guide plate is flush on the inner wall of the product tank.

3. The product tank of claim 1, wherein the at least one guide plate is welded to the inner wall of the product tank.

4. The product tank of claim 1, wherein:
    the at least one guide plate is arcuate and is mounted such that at least in portions, the at least one guide plate runs on the inner wall of the product tank and protrudes into the interior of the product tank perpendicularly to the axial direction, and
    the at least one arcuate guide plate is arranged at a position of the outlet in the axial direction of the product tank.

5. The product tank of claim 4, wherein:
    the at least one arcuate guide plate comprises two arcuate guide plates,
    the two arcuate guide plates are formed and mounted such that the two arcuate guide plates run at a same position in the axial direction on the inner wall of the product tank and protrude into the interior of the product tank perpendicularly to the axial direction, and
    the two arcuate guide plates are arranged in the axial direction at a position of the outlet to delimit the outlet.

6. The product tank of claim 1, further comprising an outlet cover arranged in the product tank at a distance from the outlet in the discharge direction and covers the product tank at the distance from the outlet in the discharge direction.

7. The product tank of claim 1, wherein:
    the at least one guide plate is arcuate and is mounted such that at least in portions, the at least one guide plate runs on the inner wall of the product tank and protrudes into the interior of the product tank perpendicularly to the axial direction, and
    the at least one arcuate guide plate comprises two parallel curved edges.

8. A device for filling a container with a filling product comprising:
    a product tank for receiving the filling product, comprising:
        an outlet configured to discharge the filling product from the product tank along a discharge direction, and
        a flow guide device that is arranged in an interior of the product tank and is configured to create a cross-flow oriented towards the discharge direction, wherein the flow guide device comprises at least one guide plate that covers part of a cross-section of the product tank and is fixed to an inner wall of the product tank, and the product tank comprises a cylindrical interior defining an axial direction, and
        wherein the at least one guide plate is arranged in a lower region of the product tank and is spaced from the outlet in the axial direction of the product tank, and the at least one guide plate covers about one-quarter of the cross-section of the product tank, or
        wherein the at least one guide plate is arcuate and is mounted such that at least in portions, the at least one guide plate runs on the inner wall of the product tank and protrudes into the interior of the product tank perpendicularly to the axial direction; and
    a mixer configured to mix the filling product from at least two components.

9. The device of claim 8, further comprising one or more filler valves configured to fill the container with the filling product, wherein the product tank is configured to contain the filling product mixed in the mixer as a buffer.

10. The device of claim 9, further comprising a buffer tank.

11. The device of claim 10, wherein the one or more filler valves is connected without buffering to the buffer tank, and/or the mixer is connected without buffering to the buffer tank.

12. The device of claim 8, wherein:
    the at least one guide plate is arcuate and is mounted such that at least in portions, the at least one guide plate runs on the inner wall of the product tank and protrudes into the interior of the product tank perpendicularly to the axial direction, and
    the at least one arcuate guide plate comprises two parallel curved edges.

* * * * *